United States Patent

Schwaiger

Patent Number: 5,028,700
Date of Patent: Jul. 2, 1991

[54] COPPER-COMPLEX FORMAZAN COMPOUNDS HAVING A FIBER-REACTIVE GROUP OF THE VINYLSULFONE SERIES, SUITABLE AS DYESTUFFS

[75] Inventor: Günther Schwaiger, Frankfurt am Main, Fed. Rep. of Germany

[73] Assignee: Hoechst Aktiengesellschaft, Frankfurt, Fed. Rep. of Germany

[21] Appl. No.: 453,705

[22] Filed: Dec. 20, 1989

[30] Foreign Application Priority Data

Dec. 22, 1988 [DE] Fed. Rep. of Germany ....... 3843135

[51] Int. Cl.$^5$ ............... C09B 62/18; C09B 62/503; D06P 1/384; D06P 3/66
[52] U.S. Cl. ............................... 534/618; 534/652
[58] Field of Search ............... 534/618, 652

[56] References Cited

U.S. PATENT DOCUMENTS

| | | | |
|---|---|---|---|
| 2,864,815 | 12/1958 | Ziegler | 534/652 |
| 3,202,650 | 8/1965 | Steinemann | 534/618 |
| 3,375,240 | 3/1968 | Beffa et al. | 534/618 X |
| 3,926,942 | 12/1975 | Yelland | 534/618 |
| 4,024,123 | 5/1977 | Dussy et al. | 534/618 |

FOREIGN PATENT DOCUMENTS 956455 4/1964 United Kingdom ............... 534/618

OTHER PUBLICATIONS

Vesely et al., Chemical Abstracts, vol. 86, No. 91742h (1977).
Wawrzyniak et al., Chemical Abstracts, vol. 78, No. 137937r (1973).

Primary Examiner—Mary C. Lee
Assistant Examiner—Fiona T. Powers

[57] ABSTRACT

Copper complex formazan compounds of the general formula (1)

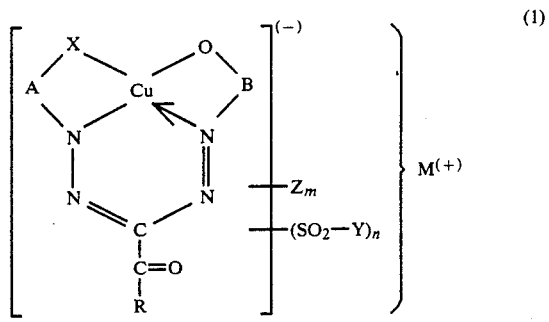

in which
A and B both independently of one another denote a benzene or naphthalene ring, both of which can be substituted by substitutents customary in fiber-reactive dyestuffs, these substituents being, in particular, the groups Z which confer water-solubility and fiber-reactive groups —$SO_2$—Y shown in formula (1);
Z is a group which confers water-solubility, such as a carboxy of sulfo group, and can be bonded to A, B and R;
m is the number 1, 2, 3 or 4;
R is an aryl radical, for example phenyl or naphthyl, which can be substituted by one or two groups Z of the above meaning and/or by halogen, lower alkyl and/or lower alkoxy, or is a lower alkyl radical, which can be substituted by halogen, sulfo and/or carboxy;
the group —$SO_2$—Y can be bonded to A and B;
n is the number 1 or 2;
Y is vinyl or an ethyl group, which is substituted in the β-position by a substituent which can be eliminated by alkali;
X is an oxygen atom or a carbonyloxy or sulfo group;
M is hydrogen or a salt-forming metal, such as an alkali metal.
The copper complex formazan compounds of the formula (1) are particularly suitable as fiber-reactive dyestuffs for dyeing materials containing hydroxy groups and/or carboxamide groups, such as, for example, wool and synthetic polyamide fiber materials, and in particular cellulose fiber materials, such as cotton, which they dye in deep fast shades.

5 Claims, No Drawings

COPPER-COMPLEX FORMAZAN COMPOUNDS HAVING A FIBER-REACTIVE GROUP OF THE VINYLSULFONE SERIES, SUITABLE AS DYESTUFFS

The invention relates to the technical field of fiber-reactive dyestuffs.

Copper complex formazan dyestuffs of the triphenylformazan type having a fiber-reactive group from the vinylsulfone series which are capable, for example, of dyeing cellulose fiber materials in green to blue shades are known, for example, from British Patent No. 1,194,504 and U.S. Pat. Nos 4,370,145 and 4,757,135.

Novel copper complex formazan compounds which, for example, are capable of dyeing cellulose fiber materials in claret-colored and violet shades have now been found with the present invention These novel formazan compounds correspond to the general formula (1)

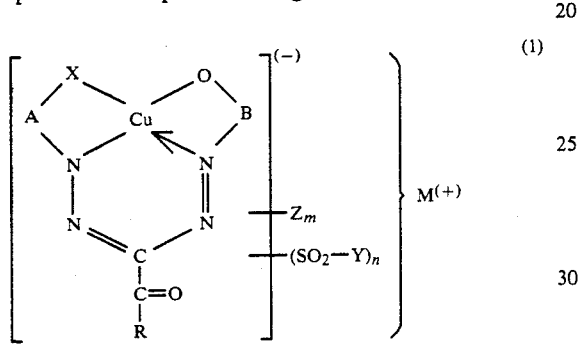

in which:

- A can be substituted by one or two groups Z, which is defined below, and/or by the group shown of the formula $-SO_2-Y$, which is defined below, and is a phenylene radical or a naphthylene radical, both of which can be substituted by substituents, such as, for example, one substituent, these belonging to the following group of substituents: halogen, such as fluorine, chlorine and bromine, alkyl having 1 to 5 bon atoms, such as methyl and ethyl, alkoxy having 1 to 5 carbon atoms, such as methoxy and ethoxy, alkylsulfonyl having 1 to 4 carbon atoms, which can be substituted, such as, for example, by hydroxy or sulfo, such as, for example, methylsulfonyl, ethylsulfonyl, β-hydroxyethylsulfonyl and β-sulfoethylsulfonyl, phenylsulfonyl, sulfamoyl, sulfamoyl which is mono- or disubstituted by alkyl having 1 to 4 carbon atoms, cycloalkylsulfamoyl having a cycloalkyl radical having 5 to 8 carbon atoms, such as, for example, cyclohexylsulfamoyl, nitro, alkanoylamino having 2 to 5 carbon atoms, such as acetylamino and propionylamino, benzoylamino, which can be substituted by 1 or 2 substituents from the group comprising sulfo, carboxy, chlorine, methyl, ethyl, methoxy and ethoxy, alkanoylamino having 2 to 5 carbon atoms, which is substituted, such as, for example, by sulfo, carboxy and/or hydroxyl, such as, for example, succinylamido, alkylsulfonylamino having 1 to 4 carbon atoms, phenylsulfonylamino, (β-sulfatoethyl)-sulfonylamino and N-methyl-N-(β-sulfatoethylsulfonyl)-amino;
- the group X and the N atom are bonded to the aromatic nucleus of A in the ortho-position relative to one another;
- B has one of the meanings of A and can be identical to A or different from A;
- the O atom and the N atom are bonded to the aromatic nucleus of B in the ortho-position relative to one another;
- R is an aryl radical, such as a phenyl or naphthyl radical, which can be substituted by one or two groups Z, which is defined below, and/or by substituents, such as one or two substituents, which belong to the following group of substituents: halogen, such as fluorine, chlorine and bromine, alkyl having 1 to 5 carbon atoms, such as methyl and ethyl, and alkoxy having 1 to 5 carbon atoms, such as methoxy and ethoxy, or
- R is a straight-chain or branched alkyl radical having 1 to 6, preferably 1 to 4, carbon atoms, such as the methyl, ethyl and propyl radical, which can be substituted by halogen, such as chlorine, bromine and fluorine, sulfo and/or carboxy , such as, for example, the trifluoromethyl group;
- Z is a group which confers water-solubility, such as, for example, the sulfo, carboxy and phosphonic acid group, and of these preferably the sulfo group, as a substituent on A, B and R, if appropriate in addition to the abovementioned substituents of A, B and R, and is contained in the formazan molecule one to four times, according to the definition of m below, and is bonded to an aromatic carbon atom or to an aliphatic carbon atom of A, B and R or a substituent thereof, such as, for example, also to an aromatic carbon atom via a methylene or ethylene bridge, preferably, however, to an aromatic carbon atom, it being possible for Z, if it is contained in the molecule 2, 3 or 4 times, to have different meanings within the abovementioned meanings;
- m is the number 1, 2, 3 or 4, preferably 1, 2 or 3;
- Y is the vinyl group or ethyl group, which contains a substituent in the β-position, which can be eliminated by means of an alkali, the group $-SO_2-Y$, as a substituent on A and B if appropriate in addition to the abovementioned substituents of A and B, being contained in the formazan molecule once or twice, according to the definition of n below, and being bonded to an aromatic carbon atom of A and B or to an aliphatic carbon atom of a substituent thereof, such as, for example, also to an aromatic carbon atom via a methylene or ethylene bridge, but preferably to an aromatic carbon atom, it being possible for the groups $-SO_2-Y$, if they are contained in the molecule twice, to have different meanings within the abovementioned meanings;
- n is the number 1 or 2;
- X is an oxygen atom or a carbonyloxy group of the formula $-CO-O-$, or a group of the formula $-SO_3^{(-)}$ bonded only to the radical A; and
- $M^{(+)}$ is a hydrogen atom or an alkali metal or the equivalent of a divalent metal, such as an alkaline earth metal, for example of calcium or magnesium, preferably a hydrogen atom, and in particular sodium, potassium or lithium.

The compounds of the general formula (1) according to the invention can be either in acid form or in the form of their salts, in particular the abovementioned alkali metal and alkaline earth metal salts. They are used, preferably in the form of the alkali metal salts, for dyeing (including printing) materials containing hydroxy groups, amino groups and/or carboxamide groups, in particular fiber materials.

Preferably, A is a benzene nucleus which can be substituted by, in addition to the group Z and/or the group —SO$_2$—Y, where Y is preferably the vinyl group and particularly preferably the β-sulfatoethyl group, a substituent from the group comprising chlorine, bromine, nitro, methyl, ethyl, methoxy, ethoxy, methylsulfonyl, ethylsulfonyl, sulfamoyl, N,N-dimethylsulfamoyl, phenylsulfonyl, β-hydroxyethylsulfonyl, β-sulfoethylsulfonyl, acetylamino, benzoylamino, succinylamino, (β-sulfato-ethylsulfonyl)-amino and N-methyl-N-(β-sulfatoethyl-sulfonyl)-amino. Preferably, B is the benzene ring which can be substituted by, in addition to Z and/or a group —SO$_2$—Y, where Y is preferably the vinyl group and particularly preferably the β-sulfatoethyl group, one or two substituents from the group comprising chlorine, bromine, nitro, methyl, ethyl, methoxy, ethoxy, methylsulfonyl, ethylsulfonyl, sulfamoyl, N,N-dimethylsulfamoyl, phenylsulfonyl, β-hydroxyethylsulfonyl, β-sulfoethylsulfonyl, acetylamino, benzoylamino, succinylamino, (β-sulfatoethylsulfonyl)-amino and N-methyl-N-(β-sulfatoethylsulfonyl)-amino.

β-Substituents of the ethyl radical which can be eliminated by means of an alkali to form the vinyl group in the radical Y are, for example, a halogen atom, such as a chlorine or bromine atom, an alkanoyloxy group having 2 to 5 carbon atoms, such as the acetoxy group, an aroyloxy group, such as the benzoyloxy or sulfobenzoyloxy group, an arylsulfonyloxy group, such as the p-methylphenylsulfonyloxy group, a lower dialkylamino group, such as the dimethylamino or diethylamino group, a phosphato group, a thiosulfato group or a sulfato group. Preferably, Y is the vinyl group and in particular the β-sulfatoethyl group.

Particularly preferred compounds of the general formula (1) are those in which A denotes a naphthylene or phenylene radical which can be substituted by—in addition to the groups Z and/or —SO$_2$—Y mentioned—1 or 2, preferably one, substituent from the group comprising chlorine, bromine, nitro, methyl, ethyl, methoxy, ethoxy, methylsulfonyl, ethylsulfonyl, β-sulfoethylsulfonyl, sulfamoyl and N,N-dimethylsulfamoyl, and B denotes a naphthylene or phenylene radical which can substituted by—in addition to the groups Z and/or —SO$_2$—Y—1 or 2 substituents from the group comprising chlorine, methyl, ethyl, methoxy, ethoxy, methylsulfonyl, ethylsulfonyl and nitro. Z here is preferably a sulfo group, one or two of which are bonded to A and/or one or two of which are bonded to B, and the group —SO$_2$—Y is bonded to A or to B or, in the case where n is 2, to A and B.

Preferably, n is the number 1, and the group —SO$_2$—Y is preferably bonded to B. Compounds of the general formula (1) which are furthermore preferred are those in which R is methyl, ethyl, phenyl or naphthyl, preferably methyl or phenyl. Particularly preferred compounds of the formula (1) are those in which A denotes the phenylene radical, which can be substituted by a methyl, ethyl, methoxy, ethoxy, nitro, β-sulfoethylsulfonyl, methylsulfonyl or ethylsulfonyl group or a chlorine atom, B denotes the phenylene radical, which is substituted by a group —SO$_2$—Y, m represents the number 1, 2 or 3, Z denotes the sulfo group and is bonded to A and/or B, X denotes the oxy or carbonyloxy radical and M and Y have the abovementioned particularly preferred meanings.

Those copper complex formazan compounds according to the invention which correspond to the following general formulae (1a) (1b) and (1c) can be singled out in particular:

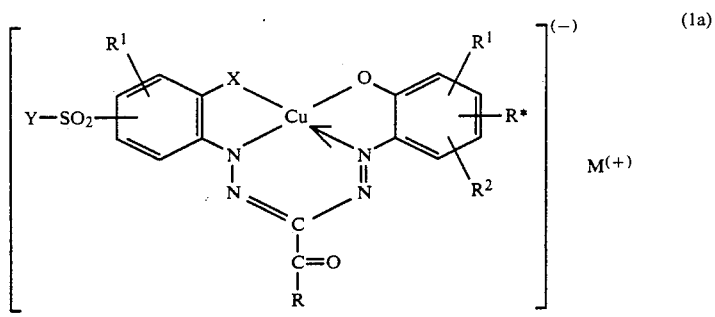

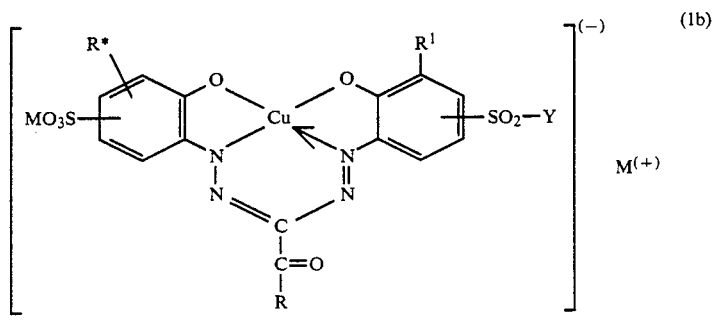

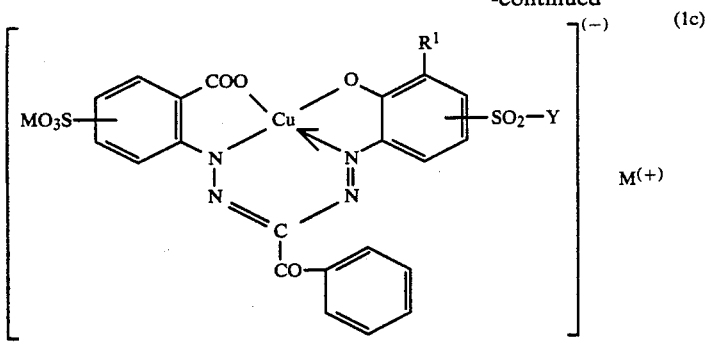

In these formulae:
R¹ is a hydrogen atom or a sulfo group, but at least one R¹ is a sulfo group;
R² is hydrogen or β-sulfatoethylsulfonyl;
R* is hydrogen, sulfo, chlorine, methylsulfonyl, ethylsulfonyl, carboxy, nitro or methyl;
R is methyl or phenyl;
X has the abovementioned meaning and is preferably carbonyloxy or oxy;
Y has one of the abovementioned particularly preferred meanings;
M is hydrogen or an alkali metal, such as sodium, potassium or lithium.

The substituents "sulfo", "carboxy", "phosphato", "thiosulfato" and "sulfato" include both the acid form thereof and the salt form thereof. Accordingly, sulfo groups denote groups corresponding to the general formula —$SO_3M$, carboxy groups denote groups corresponding to the general formula —COOM, phosphato groups denote groups corresponding to the general formula —$OPO_3M_2$, thiosulfato groups denote groups corresponding to the general formula —S—$SO_3M$ and sulfato groups denote groups corresponding to the general formula —$OSO_3M$, in each case where M has the abovementioned meaning.

The present invention furthermore relates to processes for the preparation of the abovementioned and defined compounds of the general formula (1). The processes comprise reacting an aromatic hydrazone compound of the general formula (2)

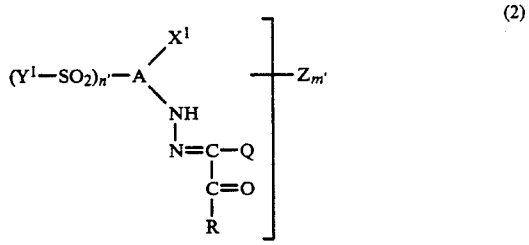

in which
A, R and Z have the abovementioned meanings,
X¹ represents the hydroxy, carboxy or sulfo group,
Y¹ has one of the meanings given for Y or is the β-hydroxyethyl group,
n' denotes the number zero or 1,
m' denotes the number zero, 1, 2 or 3,
Q is a hydrogen atom or a substituent which can replaced by azo coupling, such as, for example, the carboxy group (which is obtainable from the corresponding starting compound where Q is carbalkoxy by alkaline hydrolysis), the group X¹ and the amino group being bonded to A in the ortho-position relative to one another,
with the diazonium compound of an aromatic amine of the general formula (3)

in which
B, Z and Y¹ have one of the abovementioned meanings, the hydroxy group and the amino group being bonded to B in the ortho-position relative to one another,
m" represents the number zero, 1 or 2 and
n" denotes the number zero or 1,
the sum of (m'+m") being equal to the meaning of m and the sum of (n'+n") being equal to the meaning of n, in the presence of a copper-donating agent,
and, in the case where one or both of the groups Y¹ represent the β-hyiroxyethyl group, converting this (these) group(s) in the copper formazan compound formed into the β-sulfatoethylsulfonyl-copper complex formazan compound according to the invention by procedures analogous to known procedures by means of a sulfating agent, such as sulfuric acid or amidosulfonic acid in pyridine.

The customary procedure analogous to known procedures for the preparation of metal complex formazan compounds can be used in the synthesis of the compounds (1) according to the invention. Preferably, the process according to the invention is carried out at a pH of 3 to 8, in particular 4.5 to 6, and at a temperature between about 0° C. and 30° C., it also being possible for the reaction temperature to be increased up to 60° C. during the coupling step. The reaction components can be added as desired, but the process can be carried out particularly easily as a three-component reaction.

Examples of copper-donating compounds are the simple and complex salts of copper, such as, for example, copper sulfate, copper chloride, copper acetate or copper carbonate, and the copper salts of salicylic acid or tartaric acid.

If the copper salts of mineral acids are used, the reaction is advantageously carried out in the presence of an acid-buffering agent, such as, for example, an alkali metal or alkaline earth metal hydroxide or carbonate or an alkali metal salt of a lower alkanecarboxylic acid, such as acetic acid, or a basic alkali metal salt of phosphoric acid. These alkali metal or alkaline earth metal compounds are, in particular, the sodium, potassium, lithium and calcium compounds, and preferably, for example, sodium hydroxide, potassium hydroxide, calcium hydroxide, sodium, lithium and potassium carbonate, calcium carbonate, sodium bicarbonate, sodium acetate, disodium hydrogen phosphate, trisodium phosphate and magnesium oxide.

The copper-donating agent is used in equimolar amounts, so that one copper atom is present per compound of the formula (1) to be formed. The coupling reaction and metallization usually already proceed to completion at room temperature, but a reaction temperature of up to 60° C. can also be chosen.

The compounds (1) according to the invention can be prepared, for example, by a procedure in which a hydrazone compound of the general formula (2) is dissolved in water with an alkali, such as sodium hydroxide solution or sodium carbonate, at room temperature; the pH is preferably kept at 5 to 7. The diazonium salt solution of the amine of the general formula (3) is then added. The reaction is preferably carried out at a pH between 4 and 7, in particular between 4.5 and 6. It is preferably carried out at a reaction temperature of not more than 20° C., in particular not more than 15° C. The equimolar amount of the copper-donating agent, for example as copper sulfate in aqueous solution, is added at the same time as, i.e. also—together with—or after the addition of the diazonium compound. The metallization reaction is also advantageously carried out at a pH of 4 to 6, in particular 4.5 to 6. The metallization and coupling reaction take place simultaneously. The metallization reaction proceeds relatively rapidly. Before isolation of the metal complex formazan compound prepared, however, it is advantageous to heat the reaction solution up to 60° C. and to clarify it by means of kieselguhr. The batch is then brought to a pH of 5 to 6 and the compound according to the invention is isolated from the synthesis solution in the customary manner, for example by salting out by means of an electrolyte, such as sodium chloride or potassium chloride. If appropriate, the compound (1) can also be isolated by evaporation of the solution, such as, for example, spray drying. In this case, it is advisable, if the reaction has not gone to completion, for residual ionic copper to be eliminated by customary methods such as are known from the literature for the precipitation of copper ions, for example by means of oxalic acid, stearic acid, trimercapto-triazine, sodium sulfide and agents having a similar action; ion exchangers, for example, are also useful for this.

Aldehydes which are used according to the invention as starting compounds are, in particular, methylglyoxal and phenylglyoxal.

Numerous aromatic amino compounds of the general formula $X-A-NH_2$ which are used as starting compounds for the corresponding aromatic hydrazines are described in the literature. Examples of such aromatic amines are 2-aminophenol, 2-aminophenol-4- or -5-sulfonic acid, 2-aminophenol-3,5-or -4,6-disulfonic acid, 2-aminophenol-4- or -5-sulfonamide, 4-ethylsulfonyl-2-aminophenol, 4-ethylsulfonyl-6-sulfo-2-amino-phenol, 4-methylsulfonyl-6-sulfo-2-aminophenol, 6-acetylamino-2-aminophenol-4-sulfonic acid, 6-chloro-2-aminophenol-4-sulfonic acid, 6-nitro-2-aminophenol-4-sulfonic acid, 4-chloro-2-aminophenol-6-sulfonic acid, 4-nitro-2-amino-phenol-6-sulfonic acid, 4-methyl-2-aminophenol-6-sulfonic acid, 6-succinylamino-2-aminophenol-4-sulfonic acid, 6-sulfobenzoylamino-2-aminophenol-4-sulfonic acid, 6-methyl-4-sulfo-2-aminophenol, 4- or 5-methyl=2-amino-phenol, 4- or 5- or 6-chloro-2-aminophenol, 4-sulfo-6-carboxy-2-aminophenol, 4-methoxy-2-aminophenol, 5-methylsulfonyl-2aminopheno, 1,4-diethylsulfamoyl-6-sulfo-2-aminopheno-1,4-bromo-6-sulfo-2-aminophenol, 4- or 5-(N-β-hydroxyyethyl)sulfamoyl-2-aminophenol, 4-(N-methyl-N-β-sulfatoethylsulfonyl)-amino-6-sulfo-2-aminophenol, 4-(N-β-sulfato-1-amino2-naphthol-4- or -6-sulfonic acid, 1-amino-2-naphthol-3,6- or -4,6- or 4,7-disulfonic acid, 6-nitro-1-diazo-2-naphthol-4-sulfonic acid, 4-(β-sulfatoethylsulfonyl)-2-aminophenol and derivatives thereof which are substituted in the 6-position by chlorine or nitro or methyl, 5-(β-sulfatoethylsulfonyl)-2-aminophenol, 4-(β-sulfatoethylsulfonyl)-6-sulfoaminophenol, theβ-hydroxyethylsulfonyl derivatives of these β-sulfatoethylsulfonyl compounds, 4-(N-methyl-N-β-sulfoethylsulfonyl)-amino-6-sulfo-2-aminophenol, 4-(N-methyl-N-β-sulfoethylsulfonyl)-amino-6-sulfo-2-aminophenol, 4-(N-β-sulfoethylsulfonyl)-amino-2-aminophenol, 4-(β-sulfoethylsulfonyl)-2-aminophenol and derivatives thereof which are substituted in the 6-position by chlorine or nitro or methyl, 5-(β-sulfoethylsulfonyl)-2-aminophenol, 4-(β-sulfatoethylsulfonyl)-6-sulfoaminophenol, 2-amino-benzoic acid, 4- or 5-sulfo-2-amino-benzoic acid, 5-nitro-2-amino-benzoic acid, 5-chloro-2-amino-benzoic acid, 5-methoxy-2-amino-benzoicacid, 5-sulfamoyl-2-amino-benzoic acid, 5-methylsulfamoyl-2-amino-benzoic acid, 5-phenylsulfamoyl-2-amino-benzoic acid, 2-amino-4-(β-hydroxyethylsulfonyl)-benzoic acid, 2-amino-4-(β-sulfatoethylsulfonyl)-benzoic acid, 2-amino-5-(β-hydroxy-ethylsulfonyl)-benzoic acid, 2-amino-5-(β-sulfatoethylsulfonyl)-benzoic acid, aniline-2-sulfonic acid, aniline-2,4-disulfonic acid, aniline-2,5-disulfonic acid, 5- and 4-methylaniline-2-sulfonic acid, 2,4-dimethyl-aniline-6-sulfonic acid, 4,5-dimethyl-aniline-2-sulfonic acid, 2-methyl-aniline-4,6-disulfonic acid, 4-methyl-aniline-2,5-disulfonic acid, 4- and 5-methoxy-aniline-2-sulfonic acid, 4-methoxy-5-chloro-aniline-2-sulfonic acid, 4,5-dimethoxy-aniline-2-sulfonic acid, 4- and 5-ethoxyaniline-2-sulfonic acid, 4- and 5-hydroxy-aniline-2-sulfonic acid, 5-hydroxy-aniline-2,4-disulfonic acid, 4and 5-carboxyaniline-2-sulfonic acid, 4-hydroxy-3-carboxy-aniline-2-sulfonic acid, 4- and 5-nitro-aniline-2-sulfonic acid, 2,4-dinitro-aniline-6-sulfonic acid, 5-nitro-4-chloro-aniline-2-sulfonicacid, 4-fluoro-aniline-2-sulfonic acid, 3-, 4- and 5-chloro-aniline-2-sulfonic acid, 4,5-dichloro-aniline-2-sulfonic acid, 2,4-dichloroaniline-6-sulfonic acid, 2,4,5-trichloro-aniline-2sulfonic acid, 4-chloro-5-carboxy-aniline-2-sulfonic acid, 2,5-dichloro-4-nitro-aniline-6-sulfonic acid, 4and 5-bromo-aniline-2-sulfonic acid, 2,4- and 3,4-dibromo-aniline-6-sulfonic acid, 4- and 5-iodo-aniline-2sulfonic acid, 4- and 5-acetamino-aniline-2-sulfonic acid, 1-naphthylamine-2-sulfonic acid, 2-naphthylamine-1-sulfonic acid, 1-naphthylamine-2,4-disulfonic acid, 1-naphthylamine-2,5-disulfonic acid, 2-naphthylamine-1,5-disulfonic acid, 2-naphthylamine-1,7-disulfonic acid, 2-naphthylamine-3,6-disulfonic acid, 2-naphthylamine-3,7-disulfonic acid, 1-naphthylamine-2,4,7-trisulfonic acid, 2-naphthylamine-3,6,8-trisulfonic acid and 2-naphthylamine-1,5,7-trisulfonic acid, 2-amino-4-(β-hydroxyethylsulfonyl)-benzenesulfonic acid, 2-amino-4-(β-sulfatoethylsulfonyl)-benzenesulfonic acid, 2-amino-4-(β-hydroxyethylsulfonyl)-benzene-1,5-disulfonic acid, 2-amino-4-(β-sulfatoethylsulfonyl)-benzene-1,5-disulfonic acid, 2-amino-β-(2-hydroxyethylsulfonyl)-benzenesulfonic acid and 2-amino-5-(β-sulfatoethylsulfonyl)-benzenesulfonic acid.

The ortho-hy-droxy-arylamines having the formula radical B which are used as diazo components in the synthesis of the compounds (1) according to the invention are, for example, all those compounds mentioned for the derivatives having the formula radical A which are o-aminophenol and o-amino-naphthol derivatives.

The hydrazone compounds of the formula (2) where Q is hydrogen which are used as the starting compound are obtained from the corresponding phenyl- and naphthylhydrazines —which can in turn be prepared in a manner which is customary and known per se, for example from the corresponding diazonium compounds with salts of sulfurous acid, the intermediate N-sulfonic acids being hydrolyzed with mineral acids—by reaction with the corresponding aldehyde of the general formula R—CO—CHO, where R has the abovementioned meaning.

The hydrazone compounds of the general formula (2) where Q is the carboxy group mentioned, which can be split off, can preferably be obtained in a manner which is customary per se when a methylene compound which can be coupled in two positions and contains the structural portion of the formula radical R—CO— is coupled with the diazonium compound of an aromatic amino compound of the general formula (4)

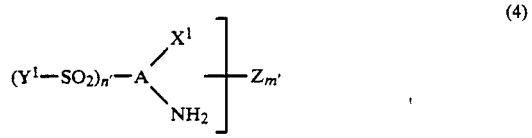

(4)

in which $Y^1$, n', A, $X^1$, Z and m' have the abovementioned meanings. Examples of methylene compounds which can be coupled in two positions and which, after coupling has taken place, still contain an optionally modified carboxy group on the methine carbon are the benzoylacetic esters, such as methyl benzoylacetate or ethyl benzoylacetate, benzoylacetone or the benzoylacetic acid esters in which the benzene radicals are substituted by carboxy sulfo, nitro and/or chlorine, and moreover the acetylacetic esters, such as methyl acetylacetate and ethyl acetylacetate, acetylacetone, the butyrylacetic acid esters, such as, for example, the methyl and ethyl esters, the propionylacetic acid esters, such as, for example, the methyl and ethyl esters, and moreover acetylacetic acid, benzoylacetic acid, acetylacetamide and benzoylacetamide. When the alkaline hydrolysis of the ester group has taken place, the hydrazone of the formula (2), if this contains a group in which $Y^1$ represents the β-hydroxyethyl group, can be esterified to the sulfato compound by means of sulfuric acid or sulfuric acid containing sulfur trioxide.

The copper complex formazan compounds according to the invention (called compounds (1) below) have useful dyestuff properties. They are preferably used for dyeing (in the general sense) materials containing hydroxy, amino and/or carboxamide groups, for example in the form of sheet-like structures, such as paper and leather, or in bulk, such as polyamide and polyurethane, and in particular those materials in fiber form.

The present invention accordingly also relates to the use of the compounds (1) for dyeing (including bulk dyeing and dyeing by printing) these materials and processes for dyeing such materials by a procedure which is customary per se, in which a compound (1) is used as the coloring agent. The materials are preferably used in the form of fiber materials, in particular in the form of textile fibers.

Materials containing hydroxy groups are naturally occurring or synthetic materials containing hydroxy groups, such as, for example, cellulose fiber materials or regenerated products thereof and polyvinyl alcohols. Cellulose fiber materials are preferably cotton, but also other plant fibers, such as linen, hemp, jute and ramie fibers; regenerated cellulose fibers are, for example, viscose staple and filament viscose.

Examples of materials containing carboxamide groups are synthetic and naturally occurring -polyamides and polyurethanes, in particular in the form of fibers, for example wool and other animal hair, silk, leather, polyamide 6,6, polyamide 6, polyamide 11 and polyamide 4.

The compounds (1) can be applied to and fixed on the substrates mentioned, in particular on the fixed materials mentioned, by the use techniques known for water-soluble dyestuffs, and in particular for fiber-reactive dyestuffs.

Very good color yields are thus obtained with them on cellulose fibers by the exhaustion processes from a long liquor using the most diverse acid-binding agents and if appropriate neutral salts, such as, for example, sodium chloride or sodium sulfate. Dyeing is carried out at temperatures between 40° and 100° C., if appropriate at temperatures of up to 120° C., under pressure, if appropriate in the presence of customary dyeing auxiliaries, in an aqueous bath. A procedure can be followed here in which the material is introduced into the hot bath, this is gradually heated up to the desired dyeing temperature and the dyeing process is brought to completion at this temperature. The neutral salts which accelerate the exhaustion of the dyestuff can also be added to the bath, if desired, only after the actual dyeing temperature has been reached.

Excellent color yields are likewise obtained by the padding process on cellulose fibers, it being possible for fixing to be carried out in the customary manner by batching at room temperature or elevated temperature, for example up to about 60° C., by steaming or with dry heat in the customary manner.

Deep prints with a good contour status and a clear white ground are likewise obtained by the customary printing processes for cellulose fibers. The result of the prints depends on varying fixing conditions to only a minor degree. The printing processes can be one-phase processes, in which the material is printed with a printing paste containing, for example, sodium bicarbonate or another acid-binding agent and the compound (1) and the compound (1) is fixed on the fiber by subsequent steaming at 101° to 103° C., or can be two-phase processes, in which the material is printed, for example, with a neutral or weakly acid printing ink which contains the compound (1) and the compound (1) is then fixed on the material by passing the printed material through a hot alkaline bath containing electrolyte or by over-padding with an alkaline padding liquor containing electrolyte and subsequent batching of this over-padded material or subsequent steaming or subsequent treatment with dry heat. The degrees of fixing obtained with the compounds (1) are high both in dyeing and in printing.

Hot air of 120° to 200° C. is used for fixing by means of dry heat by the customary thermofixing processes. In addition to the customary steam of 101 to 103° C., it is also possible to use superheated steam and pressurized steam of temperatures of up to 160° C.

The acid-binding agents which effect fixing of the compounds (1) on the cellulose fibers are, for example, water-soluble basic salts of alkali metals and similarly alkaline earth metals with inorganic or organic acids or compounds which liberate alkali under the influence of heat. The alkali metal hydroxides and alkali metal salts of weak to medium-strength inorganic or organic acids may be mentioned in particular, alkali compounds preferably meaning the sodium and potassium compounds. Examples of such acid-binding agents are sodium hydroxide, potassium hydroxide, sodium carbonate, sodium bicarbonate, potassium carbonate, sodium formate, sodium dihydrogen phosphate, disodium hydrogen phosphate, sodium trichloroacetate, water-glass and trisodium phosphate.

The compounds (1) are bonded chemically to the fibers by the treatment of the compounds (1) with the acid-binding agents, if appropriate under the action of heat; the cellulose dyeings in particular exhibit excellent wetfastness properties after the customary after-treatment by rinsing to remove non-fixed portions of dyestuff.

As regards the coloristic properties of the compounds (1), it should be mentioned in particular that they are distinguished by a good stability in printing pastes and padding liquors, also in the presence of alkali, by a very good absorption capacity from a long liquor, by a good buildup and high rate of fixing in the customary dyeing and printing processes in particular at lower temperatures (i.e. room temperature up to 50° C.), by an equal depth of color in dyeing on cotton and regenerated cellulose fibers, by a level result of the dyeings and prints produced with them and also by a uniform result of dyeings from a long liquor when various amounts of electrolytes are added.

The dyeings on polyurethane fibers and polyamide fibers are usually carried out from an acid medium. Thus, for example, acetic acid and/or ammonium sulfate or acetic acid and ammonium acetate or sodium acetate can be added to the dyebath in order to obtain the desired pH. Addition of customary leveling agents, such as, for example, based on a reaction product of cyanuric chloride with three times the molar amount of an aminobenzenesulfonic acid and/or an aminonaphthalenesulfonic acid or based on a reaction product of, for example, stearylamine with ethylene oxide, is advisable for the purpose of achieving a usable levelness of the dyeing. As a rule, the material to be dyed is introduced at a temperature of about 40° C. into the initially weakly alkaline bath and is agitated therein for some time, the dyebath is then brought to a weakly acid, preferably weakly acetic acid, pH and the actual dyeing is carried out at a temperature between 60 and 98° C. However, the dyeings can also be performed at the boiling point or at temperatures of up to 120° C. (under pressure). After-treatment in an ammoniacal bath can then be carried out.

The dyeings and prints produced with the compounds (1) are distinguished by claret-red to navy blue color shades. In particular, the dyeings and prints on cellulose fiber materials, as already mentioned, have a high depth of color and good fastnesses to light, fastnesses to light when wet and fastnesses to light in the presence of perspiration, a good fastness to hypochlorite bleaching and fastness to chlorinated water, good fastness to ironing, over-dyeing and rubbing and moreover good fastnesses to washing, milling, alkali, acid and perspiration. Non-fixed portions of dyestuff can be washed out of the fiber material again easily and completely, which is an essential precondition for the good wet-fastnesses of the dyeing obtainable. The dyeings are moreover stable towards the customary synthetic resin finishes. Some of the compounds (1) are comparable in the purity of the color shade and important fastness properties to reactive dyestuffs of the azo series, but in some cases are superior in essential fastnesses, such as, for example, the fastness to light.

The following Examples serve to illustrate the invention. The parts mentioned therein are parts by weight. The percentage data are percentages by weight, unless noted otherwise. Parts by weight bear the same relation to parts by volume as the kilogram to the liter. The compounds described by way of their formulae in the Examples are shown in the form of the free acids; they are in general prepared and isolated in the form of their sodium or potassium salts and used for dyeing in the form of their salts. The starting compounds and components mentioned in the form of the free acid in the following Examples, in particular the Tabular Examples, are employed in the synthesis as such or in the form of their salts, preferably alkali metal salts.

The absorption maxima ($\lambda_{max}$) in the visible range stated for the compounds according to the invention were determined with the aid of the alkali metal salts thereof in aqueous solution. In the Tabular Examples, the $\lambda_{max}$ values are in parentheses with the indication of the color shade; the wavelength quoted is in nm.

EXAMPLE A 225 parts of 6-chloro-2-aminophenol-4-sulfonic acid are diazotized in 800 parts of a mixture of ice and water in the customary manner; the batch is then brought to a pH of 6 and stirred into a solution of 192 parts of ethyl benzoylacetate in 1000 parts of water and 90 parts by volume of a concentrated sodium hydroxide solution at 0° to 10° C., while maintaining a pH of 8 to 9. Thereafter, the mixture is acidified to a pH of 5 with hydrochloric acid and the compound of the formula

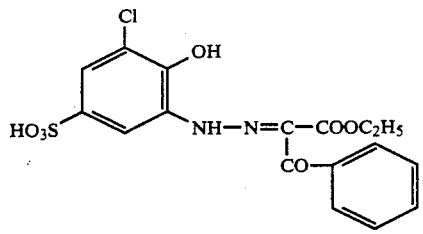

which has precipitated is isolated and then dissolved in 2000 to 3000 parts of water at a pH of 7 and a temperature of 50° C. The carbethoxy group in this compound is hydrolyzed to the carboxy group by addition of 100 parts by volume of a concentrated sodium hydroxide solution at a pH between 10 and 12 for one hour. The carboxy-hydrazone compound is precipitated by subsequently adjusting the pH of this batch to 4 to 5. It is obtained in a high yield and purity by filtration.

EXAMPLE B

A carboxy-hydrazone compound used as the starting compound for the preparation of copper complex formazan compounds according to the invention is prepared as follows: 297 parts of 4-(β-hyiroxyethylsulfonyl)-2-aminophenol-6-sulfonic acid are diazotized in a mixture of 1000 parts of ice and water in the customary manner. The diazonium salt suspension is then brought to a pH of 5 with sodium carbonate and added to a solution of 192 parts of ethyl benzoylacetate in a mixture of 1000 parts of water and 90 parts by volume of a concentrated sodium hydroxide solution; the reaction is carried out at a pH of 9 and a temperature of 0° to 10° C. Subsequent ester hydrolysis is carried out at a pH of 10 to 12 and a temperature of 50° C. over a reaction time of to 4 hours, after addition of a corresponding amount of concentrated sodium hydroxide solution. The batch is then brought to a pH of 2 to 3. The phenylhydrazone compound which has precipitated is isolated and dried and then introduced into three times the amount by weight of sulfuric acid or up to 20% strength oleum at a temperature of not more than 20° C. The batch is subsequently stirred for some time and then poured onto ice, and the phenylhydrazone of the formula

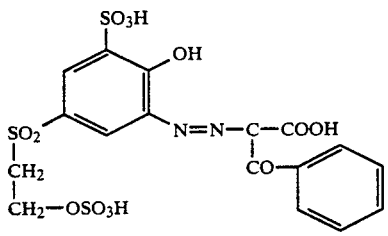

which has precipitated is isolated, if appropriate after addition of an electrolyte salt, such as sodium chloride.

EXAMPLE 1

The aqueous solution of the diazonium salt of 37.7 parts of 4-(β-sulfatoethyl-sulfonyl)-6-sulfo-2-aminophenol is added to an aqueous solution of pH 6.5 to 7 of 40 parts of the carboxy-hydrazone starting compound of Example A at 5° to 15° C., and 100 parts by volume of an aqueous 1molar copper sulfate solution is then slowly added at 10° to 15° C. in the course of 15 minutes, while maintaining a pH of between 4.0 and 6.5. The reaction mixture is subsequently stirred for a further hour, to bring the coupling reaction to completion, and if appropriate is heated to 40 to 50° C., the batch is stirred for a further hour and clarified with kieselguhr and the copper complex formazan compound formed is precipitated out of the filtrate with sodium chloride, filtered off, washed with dilute aqueous sodium chloride solution and dried. A dark electrolyte-containing powder of the alkali metal salt (sodium salt) of the compound of the formula

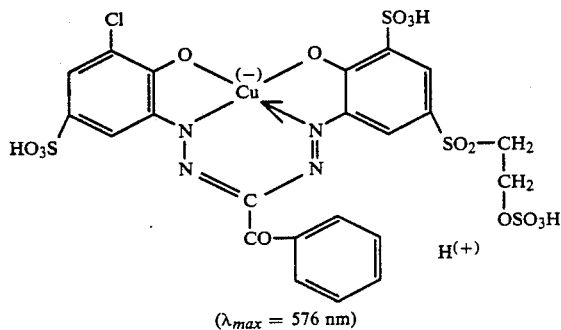

($\lambda_{max}$ = 576 nm)

is obtained. It is very suitable as a dyastuff and dyes, for example, cotton and regenerated cellulose fibers from a long liquor in the presence of an acid-binding agent at a high rate of fixing in bluish-tinged claret shades. The dyeing after-treated in the customary manner (for example by boiling treatment for 10 minutes in an aqueous bath containing a nonionic detergent and rinsing with water) has good light- and wet-fastnesses, of which the good fastness to washing, milling and perspiration, the good fastness to chlorine water, the fastness to light when wet and the fastness to light in the presence of perspiration can be singled out in particular. The good stability of prints towards acid hydrolysis is also worth mentioning.

EXAMPLE 2

The β-sulfatoethylsulfonyl-copper complex formazan compound according to the invention is converted into the corresponding vinylsulfonyl compound thereof by a procedure in which 9 parts by volume of a concentrated aqueous sodium hydroxide solution are added to the synthesis solution obtained from Example 1 and the mixture is stirred at 15° to 25° C. for some time, or in which the aqueous synthesis solution is heated to 50° to 55° C., a solution of 21 parts of sodium carbonate in 76 parts of water is added in the course of 5 to 10 minutes and the mixture is stirred at a pH of 9.2 for a further 30 to 40 minutes for complete reaction. 20 parts by volume of a 17% strength aqueous hydrochloric acid are then added at 50° to 55° C. and the pH is brought to 6.5. The vinylsulfonyl compound according to the invention, which exhibits an absorption maximum at 575 nm in aqueous solution, is isolated from the synthesis solution in the customary manner, for example by spray drying. It also has very good dyestuff properties and dyes, for example, cotton and regenerated cellulose fibers or wool by the application and fixing processes customary for fiberreactive dyestuffs giving the good properties stated for the compound of Example 1 according to the invention.

The vinylsulfonyl-copper formazan compound according to the invention can also be prepared by a procedure analogous to that of Example 1, by using the equivalent amount of the diazonium salt of 4-vinylsulfonyl-6-sulfo-2aminophenol instead of the aqueous diazonium salt solution of 4-(β-sulfatoethylsulfonyl)-6-sulfo-2-aminophenol used in that example.

EXAMPLE 3

To prepare the β-thiosulfatoethylsulfonyl-copper complex formazan compound according to the invention having the structure of the compound of Example 1 according to the invention, a procedure analogous to that of Example 1 can be followed, using 4-(β-thiosulfatoethylsulfonyl)-6-sulfo-2-aminophenol as the diazo component. However, to prepare the β-thiosulfatoethylsulfonyl compound according to the invention, it is also possible to start from the solution, obtained from the synthesis, of the vinylsulfonyl compound of Example 2 and adding 37.5 parts of crystalline sodium thiosulfate to this at a pH of 6.8 to 7.2 and a temperature of 70° to 75° C. To bring the reaction to completion, the batch is stirred for about 4 hours, while maintaining a pH of between 5.7 and 6.2 by means of acetic acid, and is then clarified by kieselguhr and filtration and the β-thiosulfatoethylsulfonyl compound according to the invention is precipitated by addition of potassium chloride in an amount of 15%, based on the volume of the filtrate. The mixture is cooled, while stirring, and the compound which has precipitated is filtered off with suction and dried.

The β-thiosulfatoethylsulfonyl compound according to the invention is obtained as the alkali metal salt, predominantly the potassium salt, in the form of a dark powder containing electrolyte salt. It has an absorption maximum at 576 nm, exhibits very good dyeing properties and dyes, for example, cotton in strong claret-colored shades with the good fastness properties mentioned for the compound according to the invention of Example 1.

EXAMPLE 4

30 parts of the carboxy-hydrazone compound obtainable by a coupling reaction of the diazonium salt of 4-sulfo-2aminophenol on ethyl acetoacetate and subsequent alkaline hydrolysis of the ester group are suspended in 250 parts of water and the compound is dissolved with concentrated aqueous sodium hydroxide solution at a pH of 6.5 to 7. An aqueous solution of the diazonium salt of 37.7 parts of 4-(β-sulfatoethylsulfonyl)-6-sulfo-2-aminophenol is then added at a pH of about 6 and a temperature of 5° to 15° C., 25 parts of crystalline copper sulfate, if appropriate in the form of an aqueous solution, are then added and the pH is kept between 4.5 and 6.5. The batch is heated to 30° to 40° C. and stirred for about a further 4 hours, the synthesis solution is clarified at a pH of 5.5 and the compound according to the invention is isolated in the customary manner, for example by spray drying or salting out.

The copper complex formazan compound of the formula (written in the form of the free acid)

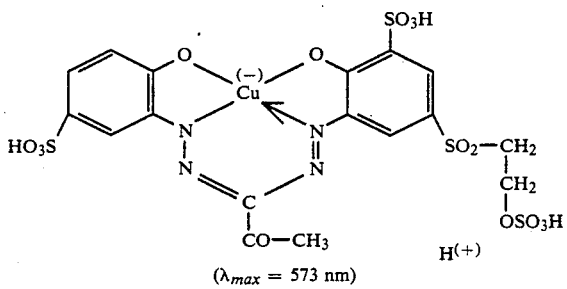

($\lambda_{max}$ = 573 nm)

according to the invention exhibits very good dyestuff properties and dyes, for example, cellulose fiber materials in deep, clear, blue-violet color shades with good light- and wet-fastnesses by the customary application and fixing methods for fiber-reactive dyestuffs.

The copper complex formazan compound according to the invention of Example 4 can also be prepared by reacting 26 parts of the hydrazone compound obtainable from 2-hydroxy-5-sulfo-phenylhydrazine and methylglyoxal with the diazonium salt of 4-(β-sulfatoethylsulfonyl)-6-sulfo-2-aminophenol by a procedure analogous to that described in Example 4.

EXAMPLE 5

The aqueous solution of the diazonium salt of 29.7 parts of 4-(β-sulfatoethylsulfonyl)-2-aminophenol are added to 43 parts of a carboxy-hydrazine compound in the form of an aqueous neutral solution (about 400 parts) and obtainable by known procedures by a coupling reaction of diazotized aniline-2,5-disulfonic acid with ethyl benzoylacetate at a pH of 13 and subsequent alkaline hydrolysis of the ester group. The reaction is carried out at a pH of 4.5 to 6.5 and a temperature of 10 to not more than 20° C. Thereafter, 100 parts by volume of an aqueous 1-molar copper sulfate solution are slowly added at a temperature between 10° and 15° C. and the pH is still kept at 4.5 to 6.5. The mixture is subsequently stirred for a few hours and, after clarifying filtration at a pH of 5, the resulting copper complex formazan compound according to the invention is isolated in the customary manner. The sodium salt of the compound of the formula

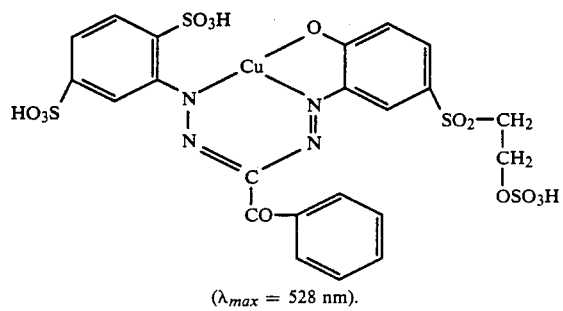

($\lambda_{max}$ = 528 nm).

is obtained in the form of a powder containing electrolyte.

The compound according to the invention exhibits very good fiber-reactive dyestuff properties and dyes the materials mentioned in the description, such as, for example, cellulose fiber materials or naturally occurring or synthetic polyamide fiber materials, in bluish-tinged claret-colored shades with a good depth of color and good fastness properties by the application and fixing methods customary for fiber-reactive dyestuffs.

EXAMPLE 6

To prepare a copper complex formazan compound according to the invention, the procedure followed is according to the procedure of Example 5, but 32 parts of the phenylhydrazone obtainable from 2,5-disulfophenylhydrazine and methylglyoxal are used as the starting substance. The compound according to the invention has, written in the form of the free acid, the formula

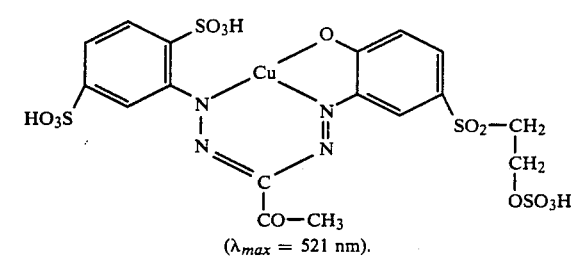

($\lambda_{max}$ = 521 nm).

It is isolated as the alkali metal salt and has good dyestuff properties. For example, cellulose fiber materials in deep red-violet shades with good fastness properties are obtained.

EXAMPLE 7

250 parts of an aqueous diazonium salt solution of 37.7 parts of 4-(β-sulfatoethylsulfonyl)-6-sulfo-2-aminophenol and 100 parts by volume of an aqueous 1 molar copper sulfate solution (the diazonium salt solution and the copper sulfate solution can also be combined beforehand) are added simultaneously to about 250 parts of an aqueous solution of pH 5.5 to 6.5 of 55 parts of the phenylhydrazone starting compound of Example B in the course of 15 minutes, while maintaining a temperature of between about 5° and 20° C., preferably 10° to 15° C., and a pH of between 4.5 and 6.5. The reaction mixture is subsequently stirred at 15° to 25° C. for about a further hour and is then heated to 40° to 50° C. When no further diazonium salt is detectable, the batch is brought to a pH of 5 and clarified by means of kieselguhr and filtration and the copper formazan compound according to the invention is precipitated from the filtrate with the aid of sodium chloride. It is filtered off and the residue is washed with dilute aqueous sodium chloride solution and dried.

The alkali metal salt of the compound of the formula

EXAMPLE 9

A neutral aqueous solution (about 250 parts) of 40 parts of a carboxy-phenylhydrazone (obtainable by coupling 2-amino-4-sulfo-benzoic acid onto ethyl benzoylacetate and subsequent alkaline hydrolysis of the ester group) is used as the starting substance and the aqueous diazonium salt solution, rendered weakly acid, of 37.7 parts of 4-($\beta$-sulfatoethylsulfonyl)-6-sulfo-2-aminophenol is added at a temperature of 5° to 15° C. and a pH of 5, and 100 parts by volume of an aqueous 1 molar copper sulfate solution are then added continuously in the course of 5 minutes at 10° to 15° C. while maintaining a pH of between 4.5 and 6.5. The mixture is subsequently stirred for a further 10 to 12 hours at 20° C. to bring the coupling reaction to completion, and the

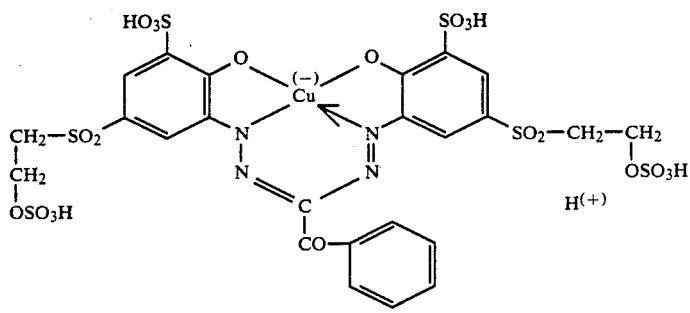

($\lambda_{max}$ = 578 nm)

according to the invention, which has very good fiber-reactive dyestuff properties and dyes, for example, cellulose fiber materials, such as cotton, in deep violet shades with good fastness properties, in particular good light-fastnesses, is obtained.

EXAMPLE 8

To prepare a copper complex formazan compound according to the invention, the procedure followed is as according to the procedure of Example 7, but the diazonium salt employed is that of 22.5 parts of 6-chloro-2-aminophenol-4-sulfonic acid. The compound according to the invention synthesized has, written in the form of the free acid, the formula

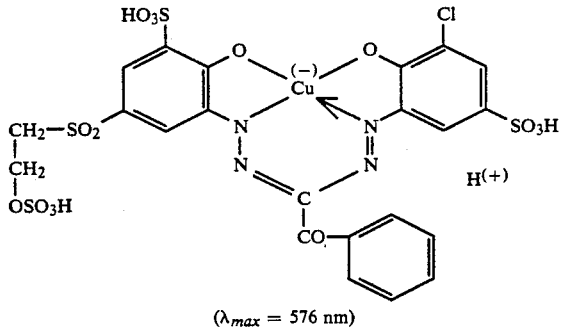

($\lambda_{max}$ = 576 nm)

and dyes, in particular, cellulose fiber materials, such as cotton, in deep claret-colored shades of good light- and wet-fastnesses, such as, for example, good fastnesses to washing and good fastnesses to alkaline and acid perspiration, by the application and fixing methods customary in the art.

reaction mixture is then heated to 40° to 50° C., subsequently stirred for a further hour and clarified by means of kieselguhr and filtration at a pH of 12.5. The copper complex formazan compound according to the invention is precipitated out of the filtrate by means of sodium chloride and isolated. It has, written in the form of the free acid, the formula

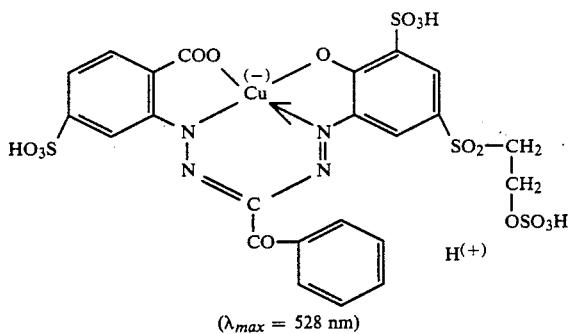

($\lambda_{max}$ = 528 nm)

and dyes, for example, cotton and regenerated cellulose fibers in pure bluish-tinged claret shades from a long liquor by the fixing conditions customary for fiberreactive dyestuffs. The dyeings and prints after-treated in the customary manner by soaping for 10 minutes and rinsing with water exhibit good light- and wet-fastness properties.

The copper complex formazan compound according to the invention can also be prepared by using 35 parts of a phenylhydrazone obtainable from 2-carboxy-5-sulfophenylhydrazine and phenylglyoxal as the starting substance.

EXAMPLES 10 TO 236

Further copper complex formazan compounds according to the invention are described in the following Tabular Examples with the aid of the formula radicals of the general formula (A)

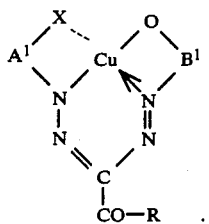

They can prepared in the manner according to the invention, for example analogously to the above Embodiment Examples, from the starting compounds which can be deduced from the components of the corresponding Tabular Example. They have very good dyestuff properties and produce, on the materials mentioned in the description, in particular cellulose fiber materials, by the application and fixing processes customary in the art for fiberreactive dyestuffs, deep dyeings and prints in the color shade stated for the particular Tabular Example for dyeing on cotton (the figures stated in parentheses after the color shade indicate the absorption maximum of the compound according to the invention in nm, measured in aqueous solution).

In the table, the radicals —$B^1$—O— are represented by the abbreviations (I), (II) and (III); these have the following meaning:

(I) is: 1-oxy-4-($\beta$-sulfatoethylsulfonyl)-6-sulfophen-2-yl (II) is: 1-oxy-4-($\beta$-sulfatoethylsulfonyl)-phen-2-yl (III) is: 1-oxy-5-($\beta$-sulfatoethylsulfonyl)-phen-2-yl.

The abbreviation VS represents the $\beta$-sulfatoethylsulfonyl group.

| Ex. | Radical —$A^1$—X— | Radical R | Radical -O-$B^1$- | Color shade |
|---|---|---|---|---|
| 10 | 1-oxy-4-sulfo-6-chloro-phen-2-yl | phenyl | (II) | bluish-tinged claret (528) |
| 11 | 1-oxy-4-sulfo-6-chloro-phen-2-yl | phenyl | (III) | reddish-tinged navy blue (584) |
| 12 | 1-oxy-4-sulfo-6-chloro-phen-2-yl | phenyl | (I) | bluish-tinged claret (576) |
| 13 | 1-oxy-4-sulfo-phen-2-yl | phenyl | (I) | bluish-tinged claret (575) |
| 14 | 1-oxy-4-sulfo-phen-2-yl | phenyl | (II) | bluish-tinged claret (567) |
| 15 | 1-oxy-4-sulfo-phen-2-yl | phenyl | (III) | reddish-tinged navy blue (581) |
| 16 | 1-oxy-4,6-disulfo-phen-2-yl | phenyl | (I) | reddish-tinged violet (582) |
| 17 | 1-oxy-4,6-disulfo-phen-2-yl | phenyl | (II) | reddish-tinged violet (576) |
| 18 | 1-oxy-4,6-disulfo-phen-2-yl | phenyl | (III) | reddish-tinged navy blue (590) |
| 19 | 1-oxy-4-sulfo-6-nitro-phen-2-yl | phenyl | (I) | bluish-tinged violet (585) |
| 20 | 1-oxy-4-sulfo-6-nitro-phen-2-yl | phenyl | (II) | bluish-tinged violet (577) |
| 21 | 1-oxy-4-sulfo-6-nitro-phen-2-yl | phenyl | (III) | reddish-tinged navy blue |
| 22 | 1-oxy-5-sulfo-phen-2-yl | phenyl | (I) | reddish-tinged navy blue |
| 23 | 1-oxy-5-sulfo-phen-2-yl | phenyl | (II) | reddish-tinged navy blue |
| 24 | 1-oxy-5-sulfo-phen-2-yl | phenyl | (III) | reddish-tinged navy blue |
| 25 | 1-oxy-4-ethyl-sulfonyl-6-sulfo-phen-2-yl | phenyl | (I) | reddish-tinged violet |
| 26 | 1-oxy-4-ethyl-sulfonyl-6-sulfo-phen-2-yl | phenyl | (II) | reddish-tinged violet |
| 27 | 1-oxy-4-ethyl-sulfonyl-6-sulfo-phen-2-yl | phenyl | (III) | reddish-tinged navy blue |
| 28 | 1-oxy-4-methyl-sulfonyl-6-sulfo-phen-2-yl | phenyl | (I) | reddish-tinged violet |
| 29 | 1-oxy-4-methyl-sulfonyl-6-sulfo-phen-2-yl | phenyl | (II) | reddish-tinged violet |
| 30 | 1-oxy-4-($\beta$-sulfatoethylsulfonyl)-6-sulfo-phen-2-yl | phenyl | (I) | reddish-tinged violet |
| 31 | 1-oxy-4-($\beta$-sulfoethylsulfonyl)-6-sulfo-phen-2-yl | phenyl | (I) | reddish-tinged violet |
| 32 | 1-oxy-4-($\beta$-sulfoethylsulfonyl)-6-sulfo-phen-2-yl | phenyl | (II) | reddish-tinged violet |
| 33 | 1-oxy-4-($\beta$-sulfo- | phenyl | (III) | reddish-tinged |

-continued

| Ex. | Radical —A¹—X— | Radical R | Radical -O-B¹- | Color shade |
|---|---|---|---|---|
| | ethylsulfonyl)-6-sulfo-phen-2-yl | | | navy blue |
| 34 | 1-oxy-4-(β-sulfoethylsulfonyl)-phen-2-yl | phenyl | (I) | reddish-tinged violet |
| 35 | 1-oxy-5-(β-sulfoethylsulfonyl)-phen-2-yl | phenyl | (I) | reddish-tinged violet |
| 36 | 1-oxy-4-sulfo-6-carboxy-phen-2-yl | phenyl | (I) | reddish-tinged violet |
| 37 | 1-oxy-4-sulfo-6-carboxy-phen-2-yl | phenyl | (II) | reddish-tinged violet |
| 38 | 1-oxy-4-sulfo-6-carboxy-phen-2-yl | phenyl | (III) | reddish-tinged navy blue |
| 39 | 1-oxy-4-sulfo-6-acetylamino-phen-2-yl | phenyl | (I) | bluish-tinged violet |
| 40 | 1-oxy-3,5-disulfo-phen-2-yl | phenyl | (I) | greenish-tinged blue |
| 41 | 1-oxy-3,5-disulfo-phen-2-yl | phenyl | (II) | greenish-tinged blue |
| 42 | 1-oxy-3,5-disulfo-phen-2-yl | phenyl | (III) | greenish-tinged navy blue |
| 43 | 1-oxy-4-chloro-6-sulfo-phen-2-yl | 3-sulfo-phenyl | (I) | reddish-tinged violet |
| 44 | 1-oxy-4-nitro-6-sulfo-phen-2-yl | 3-nitro-phenyl | (I) | bluish-tinged violet |
| 45 | 1-oxy-4-methyl-6-sulfo-phen-2-yl | phenyl | (I) | bluish-tinged violet |
| 46 | 1-oxy-3-chloro-5-sulfo-phen-2-yl | phenyl | (I) | bluish-tinged green |
| 47 | 1-oxy-3-nitro-5-sulfo-phen-2-yl | phenyl | (I) | bluish-tinged green |
| 48 | 1-oxy-3-sulfo-5-methylsulfonyl-phen-2-yl | phenyl | (I) | bluish-tinged green |
| 49 | 1-oxy-4-dimethyl-sulfamoyl-phen-2-yl | 2-carboxy-phenyl | (I) | reddish-tinged violet |
| 50 | 1-oxy-4-(3'-sulfo-phenyl-sulfonyl)-phen-2-yl | 2,6-di-fluoro-phenyl | (I) | reddish-tinged violet |
| 51 | 1-oxy-4-sulfo-6-(4'-sulfo-benzoylamino)-phen-2-yl | phenyl | (I) | bluish-tinged violet |
| 52 | 1-oxy-4-sulfo-6-(4'-sulfo-benzoylamino)-phen-2-yl | phenyl | (II) | bluish-tinged violet |
| 53 | 1-oxy-4-sulfo-6-(4'-sulfo-benzoylamino)-phen-2-yl | phenyl | (III) | reddish-tinged navy blue |
| 54 | 2-oxy-4-sulfo-6-nitro-naphth-1-yl | phenyl | (I) | bluish-tinged green |
| 55 | 2-oxy-3,6-disulfo-naphth-1-yl | phenyl | (I) | bluish-tinged green |
| 56 | 1-oxy-4-(N-methyl-N-β-sulfatoethyl-sulfonyl)-amino-phen-2-yl | phenyl | (I) | reddish-tinged violet |
| 57 | 1-oxy-4-sulfo-6-(β-carboxy-propionylamino)-phen-2-yl | phenyl | (I) | reddish-tinged blue |
| 58 | 1-oxy-4-sulfo-6-(β-carboxy-propionylamino)-phen-2-yl | phenyl | (II) | reddish-tinged blue |
| 59 | 1-oxy-4-sulfo-6-(β-carboxy-propionylamino)-phen-2-yl | phenyl | (III) | reddish-tinged navy blue |
| 60 | 1-oxy-4-phosphono-phen-2-yl | phenyl | (I) | reddish-tinged violet |
| 61 | 1-oxy-4-carboxy-6-sulfo-phen-2-yl | phenyl | (II) | reddish-tinged violet |
| 62 | 1-oxy-4-sulfamoyl-phen-2-yl | phenyl | (I) | reddish-tinged violet |
| 63 | 1-oxy-4-sulfo- | phenyl | 1-oxy-4-(β- | bluish-tinged |

-continued

| Ex. | Radical —A¹—X— | Radical R | Radical -O-B¹- | Color shade |
|---|---|---|---|---|
| | phen-2-yl | | sulfatoethyl-sulfonyl)-6-nitro-phen-2-yl | violet |
| 64 | 1-oxy-4-sulfo-6-chloro-phen-2-yl | phenyl | 1-oxy-4-($\beta$-sulfatoethyl-sulfonyl)-6-chloro-phen-2-yl | reddish-tinged violet |
| 65 | 1-oxy-4,6-disulfo-phen-2-yl | phenyl | 1-oxy-4-($\beta$-phosphatoethyl-sulfonyl)-phen-2-yl | reddish-tinged violet |
| 66 | 1-oxy-4,6-disulfo-phen-2-yl | phenyl | 1-oxy-4-($\beta$-phenylsulfon-yloxy-ethyl-sulfonyl)-phen-2-yl | reddish-tinged violet |
| 67 | 1-oxy-4,6-disulfo-phen-2-yl | phenyl | 1-oxy-4-($\beta$-propionyloxy-ethylsulfonyl)-phen-2-yl | reddish-tinged violet |
| 68 | 1-oxy-4,6-disulfo-phen-2-yl | phenyl | 1-oxy-4-($\beta$-dimethylamino-ethylsulfonyl)-phen-2-yl | reddish-tinged violet |
| 69 | 1-oxy-4-sulfo-6-chloro-phen-2-yl | methyl | (I) | reddish-tinged violet |
| 70 | 1-oxy-4-sulfo-6-chloro-phen-2-yl | methyl | (II) | reddish-tinged violet |
| 71 | 1-oxy-4-sulfo-6-chloro-phen-2-yl | methyl | (III) | reddish-tinged navy blue |
| 72 | 1-oxy-4-sulfo-phen-2-yl | trifluoro-methyl | (I) | reddish-tinged violet |
| 73 | 1-oxy-4-sulfo-phen-2-yl | methyl | (II) | reddish-tinged violet |
| 74 | 1-oxy-4-sulfo-phen-2-yl | methyl | (III) | bluish-tinged violet (565) |
| 75 | 1-oxy-4-sulfo-phen-2-yl | ethyl | (I) | reddish-tinged violet |
| 76 | 1-oxy-4-sulfo-phen-2-yl | n-propyl | (I) | reddish-tinged violet |
| 77 | 1-oxy-4-sulfo-phen-2-yl | methyl | (I) | reddish-tinged violet (573) |
| 78 | 1-oxy-4,6-disulfo-phen-2-yl | methyl | (I) | bluish-tinged violet |
| 79 | 1-oxy-4,6-disulfo-phen-2-yl | methyl | (II) | bluish-tinged violet |
| 80 | 1-oxy-4,6-disulfo-phen-2-yl | methyl | (III) | bluish-tinged violet |
| 81 | 1-oxy-4-sulfo-6-nitro-phen-2-yl | methyl | (I) | bluish-tinged violet |
| 82 | 1-oxy-4-sulfo-6-nitro-phen-2-yl | methyl | (II) | bluish-tinged violet |
| 83 | 1-oxy-4-sulfo-6-nitro-phen-2-yl | methyl | (III) | reddish-tinged navy blue |
| 84 | 1-oxy-5-sulfo-phen-2-yl | methyl | (I) | bluish-tinged violet |
| 85 | 1-oxy-5-sulfo-phen-2-yl | methyl | (II) | bluish-tinged violet |
| 86 | 1-oxy-5-sulfo-phen-2-yl | methyl | (III) | bluish-tinged violet |
| 87 | 1-oxy-4-ethyl-sulfonyl-6-sulfo-phen-2-yl | methyl | (I) | reddish-tinged violet |
| 88 | 1-oxy-4-ethyl-sulfonyl-6-sulfo-phen-2-yl | methyl | (II) | reddish-tinged violet |
| 89 | 1-oxy-4-ethyl-sulfonyl-6-sulfo-phen-2-yl | methyl | (III) | reddish-tinged navy blue |
| 90 | 1-oxy-4-methyl-sulfonyl-6-sulfo-phen-2-yl | methyl | (I) | reddish-tinged violet |
| 91 | 1-oxy-4-($\beta$-sulfatoethylsul-fonyl)-6-sulfo-phen-2-yl | methyl | (I) | reddish-tinged violet |
| 92 | 1-oxy-4-($\beta$-sulfo-ethylsulfonyl)-6-sulfo-phen-2-yl | methyl | (I) | reddish-tinged violet |
| 93 | 1-oxy-4-($\beta$-sulfo- | methyl | (II) | reddish-tinged |

-continued

| Ex. | Radical —A¹—X— | Radical R | Radical -O-B¹- | Color shade |
|---|---|---|---|---|
| | ethylsulfonyl)-6-sulfo-phen-2-yl | | | violet |
| 94 | 1-oxy-4-(β-sulfo-ethylsulfonyl)-6-sulfo-phen-2-yl | methyl | (III) | reddish-tinged navy blue |
| 95 | 1-oxy-4-(β-sulfo-ethylsulfonyl)-phen-2-yl | methyl | (I) | reddish-tinged violet |
| 96 | 1-oxy-5-(β-sulfo-ethylsulfonyl)-phen-2-yl | methyl | (I) | reddish-tinged violet |
| 97 | 1-oxy-4-sulfo-6-carboxy-phen-2-yl | methyl | (I) | reddish-tinged violet |
| 98 | 1-oxy-4-sulfo-6-carboxy-phen-2-yl | methyl | (II) | reddish-tinged violet |
| 99 | 1-oxy-4-sulfo-6-carboxy-phen-2-yl | methyl | (III) | reddish-tinged navy blue |
| 100 | 1-oxy-4-sulfo-6-acetylamino-phen-2-yl | methyl | (II) | reddish-tinged violet |
| 101 | 1-oxy-3,5-disulfo-phen-2-yl | methyl | (I) | bluish-tinged violet |
| 102 | 1-oxy-3,5-disulfo-phen-2-yl | methyl | (II) | bluish-tinged violet |
| 103 | 1-oxy-3,5-disulfo-phen-2-yl | methyl | (III) | navy blue |
| 104 | 1-oxy-4-chloro-6-sulfo-phen-2-yl | methyl | (I) | reddish-tinged violet |
| 105 | 1-oxy-4-nitro-6-sulfo-phen-2-yl | methyl | (I) | bluish-tinged violet |
| 106 | 1-oxy-4-methyl-6-sulfo-phen-2-yl | methyl | (I) | bluish-tinged violet |
| 107 | 1-oxy-3-chloro-5-sulfo-phen-2-yl | methyl | (I) | greenish-tinged blue |
| 108 | 1-oxy-3-nitro-5-sulfo-phen-2-yl | methyl | (I) | greenish-tinged blue |
| 109 | 1-oxy-3-sulfo-5-methylsulfonyl-phen-2-yl | methyl | (I) | greenish-tinged blue |
| 110 | 1-oxy-4-dimethyl-sulfamoyl-phen-2-yl | methyl | (I) | reddish-tinged violet |
| 111 | 1-oxy-4-(3'-sulfo-phenyl-sulfonyl)-phen-2-yl | methyl | (I) | reddish-tinged violet |
| 112 | 1-oxy-4-sulfo-6-(4'-sulfobenzoyl-amino)-phen-2-yl | methyl | (I) | reddish-tinged violet |
| 113 | 1-oxy-4-sulfo-6-(4'-sulfobenzoyl-amino)-phen-2-yl | methyl | (II) | reddish-tinged violet |
| 114 | 1-oxy-4-sulfo-6-(4'-sulfobenzoyl-amino)-phen-2-yl | methyl | (III) | reddish-tinged navy blue |
| 115 | 2-oxy-4-sulfo-6-nitro-naphth-1-yl | methyl | (I) | bluish-tinged green |
| 116 | 2-oxy-3,6-disulfo-naphth-1-yl | methyl | (I) | bluish-tinged green |
| 117 | 1-oxy-4-(N-methyl-N-β-sulfatoethyl-sulfonyl)-amino-6-sulfo-phen-2-yl | methyl | (I) | bluish-tinged violet |
| 118 | 1-oxy-4-sulfo-6-(β-carboxy-propionylamino)-phen-2-yl | methyl | (I) | bluish-tinged violet |
| 119 | 1-oxy-4-sulfo-6-(β-carboxy-propionylamino)-phen-2-yl | methyl | (II) | bluish-tinged violet |
| 120 | 1-oxy-4-sulfo-6-(β-carboxy-propionylamino)-phen-2-yl | methyl | (III) | bluish-tinged violet |
| 121 | 1-oxy-4-sulfo-phen-2-yl | 1-naphthyl | (I) | bluish-tinged violet |
| 122 | 1-oxy-4-sulfo-phen-2-yl | sulfo-naphth-1-yl | (II) | bluish-tinged violet |
| 123 | 1-carbonyloxy-4-sulfo-phen-2-yl | phenyl | (II) | bluish-tinged claret (524) |

-continued

| Ex. | Radical —A¹—X— | Radical R | Radical -O-B¹- | Color shade |
|---|---|---|---|---|
| 124 | 1-carbonyloxy-4-sulfo-phen-2-yl | phenyl | (III) | bluish-tinged claret (538) |
| 125 | 1-carbonyloxy-5-sulfo-phen-2-yl | phenyl | (I) | bluish-tinged claret |
| 126 | 1-carbonyloxy-5-sulfo-phen-2-yl | phenyl | (II) | bluish-tinged claret |
| 127 | 1-carbonyloxy-5-sulfo-phen-2-yl | phenyl | (III) | bluish-tinged claret |
| 128 | 1-carbonyloxy-phen-2-yl | phenyl | (I) | bluish-tinged claret |
| 129 | 1-carbonyloxy-4-methoxy-phen-2-yl | phenyl | (I) | bluish-tinged claret |
| 130 | 1-carbonyloxy-5-chloro-phen-2-yl | phenyl | (I) | bluish-tinged claret |
| 131 | 1-carbonyloxy-4-nitro-phen-2-yl | phenyl | (I) | bluish-tinged claret |
| 132 | 1-carbonyloxy-4-carboxy-phen-2-yl | phenyl | (I) | bluish-tinged claret |
| 133 | 1-carbonyloxy-5-acetylamino-phen-2-yl | phenyl | (I) | bluish-tinged claret |
| 134 | 1-carbonyloxy-4-sulfo-phen-2-yl | methyl | (I) | bluish-tinged claret (524) |
| 135 | 1-carbonyloxy-4-sulfo-phen-2-yl | methyl | (II) | bluish-tinged claret (519) |
| 136 | 1-carbonyloxy-4-sulfo-phen-2-yl | methyl | (III) | bluish-tinged claret (534) |
| 137 | 1-carbonyloxy-5-sulfo-phen-2-yl | methyl | (I) | bluish-tinged claret |
| 138 | 1-carbonyloxy-5-sulfo-phen-2-yl | methyl | (II) | bluish-tinged claret |
| 139 | 1-carbonyloxy-5-sulfo-phen-2-yl | methyl | (III) | bluish-tinged claret |
| 140 | 1-carbonyloxy-phen-2-yl | methyl | (I) | bluish-tinged claret |
| 142 | 1-carbonyloxy-4-methoxy-phen-2-yl | methyl | (I) | bluish-tinged claret |
| 143 | 1-carbonyloxy-5-chloro-phen-2-yl | methyl | (I) | bluish-tinged claret |
| 144 | 1-carbonyloxy-4-nitro-phen-2-yl | methyl | (I) | bluish-tinged claret |
| 145 | 1-carbonyloxy-4-N-(β-sulfato-ethylsulfonyl)-amino-phen-2-yl | methyl | (I) | bluish-tinged claret |
| 146 | 1-carbonyloxy-4-(β-sulfatoethyl-sulfonyl)-phen-2-yl | methyl | (I) | bluish-tinged claret |
| 147 | 1,4-disulfo-phen-2-yl | phenyl | (I) | bluish-tinged claret (528) |
| 148 | 1,4-disulfo-phen-2-yl | phenyl | (III) | bluish-tinged claret (538) |
| 149 | 1,5-disulfo-phen-2-yl | phenyl | (I) | bluish-tinged claret |
| 150 | 1,5-disulfo-phen-2-yl | phenyl | (II) | bluish-tinged claret |
| 151 | 1,5-disulfo-phen-2-yl | phenyl | (III) | bluish-tinged claret |
| 152 | 1-sulfo-phen-2-yl | phenyl | (I) | bluish-tinged claret |
| 153 | 1-sulfo-phen-2-yl | phenyl | (II) | bluish-tinged claret |
| 154 | 1-sulfo-phen-2-yl | phenyl | (III) | bluish-tinged claret |
| 155 | 1-sulfo-5-methoxy-phen-2-yl | phenyl | (III) | bluish-tinged claret |
| 156 | 1-sulfo-5-carboxy-phen-2-yl | phenyl | (I) | bluish-tinged claret |
| 157 | 1-sulfo-4-carboxy-phen-2-yl | phenyl | (II) | bluish-tinged claret |
| 158 | 1-sulfo-4-chloro-phen-2-yl | phenyl | (I) | bluish-tinged claret |
| 159 | 1,4-disulfo-phen-2-yl | methyl | (I) | bluish-tinged claret |
| 160 | 1,4-disulfo-phen-2-yl | methyl | (III) | bluish-tinged claret |
| 161 | 1,5-disulfo-phen-2-yl | methyl | (I) | bluish-tinged claret |
| 162 | 1,5-disulfo-phen-2-yl | methyl | (II) | bluish-tinged claret |

-continued

| Ex. | Radical —A¹—X— | Radical R | Radical -O-B¹- | Color shade |
|---|---|---|---|---|
| 163 | 1,5-disulfo-phen-2-yl | methyl | (III) | bluish-tinged claret |
| 164 | 1-sulfo-phen-2-yl | methyl | (I) | bluish-tinged claret |
| 165 | 1-sulfo-phen-2-yl | methyl | (II) | bluish-tinged claret |
| 166 | 1-sulfo-phen-2-yl | methyl | (III) | bluish-tinged claret |
| 167 | 1-sulfo-5-methoxy-phen-2-yl | methyl | (I) | bluish-tinged claret |
| 168 | 1-sulfo-5-carboxy-phen-2-yl | methyl | (I) | bluish-tinged claret |
| 169 | 1-sulfo-4-carboxy-phen-2-yl | methyl | (II) | bluish-tinged claret |
| 170 | 1-sulfo-4-chloro-phen-2-yl | methyl | (I) | bluish-tinged claret |
| 171 | 1-oxy-4-VS-6-sulfo-phen-2-yl | phenyl | (II) | bluish-tinged claret |
| 172 | 1-oxy-4-VS-6-sulfo-phen-2-yl | phenyl | (III) | bluish-tinged claret |
| 173 | 1-oxy-4-VS-6-sulfo-phen-2-yl | phenyl | 1-oxy-4-sulfo-phen-2-yl | bluish-tinged claret |
| 174 | 1-oxy-4-VS-6-sulfo-phen-2-yl | phenyl | 1-oxy-4,6-di-sulfo-phen-2-yl | reddish-tinged violet |
| 175 | 1-oxy-4-VS-6-sulfo-phen-2-yl | phenyl | 1-oxy-4-sulfo-6-acetylamino-phen-2-yl | reddish-tinged violet |
| 176 | 1-oxy-4-VS-6-sulfo-phen-2-yl | phenyl | 1-oxy-4-sulfo-6-(β-carboxy-propionylamino)-phen-2-yl | reddish-tinged violet |
| 177 | 1-oxy-4-VS-6-sulfo-phen-2-yl | phenyl | 1-oxy-4-sulfo-6-nitro-phen-2-yl | bluish-tinged violet |
| 178 | 1-oxy-4-VS-6-sulfo-phen-2-yl | phenyl | 1-oxy-4-ethyl-sulfonyl-6-sulfo-phen-2-yl | reddish-tinged violet |
| 179 | 1-oxy-4-VS-phen-2-yl | phenyl | 1-oxy-4,6-disulfo-phen-2-yl | reddish-tinged violet |
| 180 | 1-oxy-4-VS-phen-2-yl | phenyl | (I) | reddish-tinged violet |
| 181 | 1-oxy-5-VS-phen-2-yl | phenyl | (I) | reddish-tinged violet |
| 182 | 1-oxy-5-VS-phen-2-yl | phenyl | 1-oxy-4,6-disulfo-phen-2-yl | reddish-tinged violet |
| 183 | 1-sulfo-5-VS-phen-2-yl | methyl | 1-oxy-4-sulfo-phen-2-yl | bluish-tinged claret |
| 184 | 1-oxy-4-VS-6-sulfo-phen-2-yl | methyl | (II) | reddish-tinged violet |
| 185 | 1-oxy-4-VS-6-sulfo-phen-2-yl | methyl | (III) | bluish-tinged violet |
| 186 | 1-oxy-4-VS-6-sulfo-phen-2-yl | methyl | 1-oxy-4-sulfo-phen-2-yl | reddish-tinged violet |
| 187 | 1-oxy-4-VS-6-sulfo-phen-2-yl | methyl | 1-oxy-4,6-di-sulfo-phen-2-yl | reddish-tinged violet |
| 188 | 1-oxy-4-VS-6-sulfo-phen-2-yl | methyl | 1-oxy-4-sulfo-6-acetylamino-phen-2-yl | reddish-tinged violet |
| 189 | 1-oxy-4-VS-6-sulfo-phen-2-yl | methyl | 1-oxy-4-sulfo-6-(β-carboxy-propionyl-amino)-phen-2-yl | reddish-tinged violet |
| 190 | 1-oxy-4-VS-6-sulfo-phen-2-yl | methyl | 1-oxy-4-sulfo-6-nitro-phen-2-yl | bluish-tinged violet |
| 191 | 1-oxy-4-VS-6-sulfo-phen-2-yl | methyl | 1-oxy-4-ethyl-sulfonyl-6-sulfo-phen-2-yl | reddish-tinged violet |
| 192 | 1-oxy-4-VS-phen-2-yl | methyl | 1-oxy-4,6-di-sulfo-phen-2-yl | reddish-tinged violet |
| 193 | 1-oxy-4-VS-phen-2-yl | methyl | (I) | reddish-tinged violet |
| 194 | 1-oxy-5-VS-phen-2-yl | methyl | (I) | bluish-tinged violet |

-continued

| Ex. | Radical —A¹—X— | Radical R | Radical -O-B¹- | Color shade |
|---|---|---|---|---|
| 195 | 1-oxy-5-VS-phen-2-yl | methyl | 1-oxy-4,6-di-sulfo-phen-2-yl | bluish-tinged violet |
| 196 | 1-carbonyloxy-4-VS-phen-2-yl | phenyl | (I) | bluish-tinged claret |
| 197 | 1-carbonyloxy-4-VS-phen-2-yl | phenyl | 1-oxy-4,6-di-sulfo-phen-2-yl | bluish-tinged claret |
| 198 | 1-carbonyloxy-4-VS-phen-2-yl | phenyl | 1-oxy-4-sulfo-phen-2-yl | bluish-tinged claret |
| 199 | 1-carbonyloxy-4-VS-phen-2-yl | phenyl | 1-oxy-4-sulfo-6-chloro-phen-2-yl | bluish-tinged claret |
| 200 | 1-carbonyloxy-4-VS-phen-2-yl | phenyl | 1-oxy-4-methyl-sulfonyl-6-sulfo-phen-2-yl | bluish-tinged claret |
| 201 | 1-carbonyloxy-4-VS-phen-2-yl | phenyl | 1-oxy-4-sulfo-6-acetylamino-phen-2-yl | bluish-tinged claret |
| 202 | 1-carbonyloxy-4-VS-phen-2-yl | phenyl | 1-oxy-4-sulfo-6-(β-carboxy-propionyl-amino)-phen-2-yl | bluish-tinged claret |
| 203 | 1-carbonyloxy-4-VS-phen-2-yl | phenyl | 2-oxy-4,6-di-sulfo-naphth-1-yl | bluish-tinged violet |
| 204 | 1-carbonyloxy-5-VS-phen-2-yl | phenyl | 1-oxy-4,6-di-sulfo-phen-2-yl | bluish-tinged claret |
| 205 | 1-carbonyloxy-5-VS-phen-2-yl | phenyl | 1-oxy-4-sulfo-phen-2-yl | bluish-tinged claret |
| 206 | 1-carbonyloxy-4-VS-phen-2-yl | methyl | (I) | bluish-tinged claret |
| 207 | 1-carbonyloxy-4-VS-phen-2-yl | methyl | 1-oxy-4,6-di-sulfo-phen-2-yl | bluish-tinged claret |
| 208 | 1-carbonyloxy-4-VS-phen-2-yl | methyl | 1-oxy-4-sulfo-phen-2-yl | bluish-tinged claret |
| 209 | 1-carbonyloxy-4-VS-phen-2-yl | methyl | 1-oxy-5-sulfo-6-chloro-phen-2-yl | bluish-tinged claret |
| 210 | 1-carbonyloxy-4-VS-phen-2-yl | methyl | 1-oxy-4-methyl-sulfonyl-6-sulfo-phen-2-yl | bluish-tinged claret |
| 211 | 1-carbonyloxy-4-VS-phen-2-yl | methyl | 1-oxy-4-sulfo-6-acetylamino-phen-2-yl | bluish-tinged claret |
| 212 | 1-carbonyloxy-4-VS-phen-2-yl | methyl | 1-oxy-4-sulfo-6-(β-carboxy-propionyl-amino)-phen-2-yl | bluish-tinged claret |
| 213 | 1-carbonyloxy-4-VS-phen-2-yl | methyl | 2-oxy-4,6-di-sulfo-naphth-1-yl | bluish-tinged claret |
| 214 | 1-carbonyloxy-5-VS-phen-2-yl | methyl | 1-oxy-4,6-di-sulfo-phen-2-yl | bluish-tinged claret |
| 215 | 1-carbonyloxy-5-VS-phen-2-yl | methyl | 1-oxy-4-sulfo-phen-2-yl | bluish-tinged claret |
| 216 | 1-sulfo-4-VS-phen-2-yl | phenyl | (I) | bluish-tinged claret |
| 217 | 1-sulfo-4-VS-phen-2-yl | phenyl | (II) | bluish-tinged claret |
| 218 | 1-sulfo-4-VS-phen-2-yl | phenyl | (III) | bluish-tinged claret |
| 219 | 1-sulfo-4-VS-phen-2-yl | phenyl | 1-oxy-4-sulfo-phen-2-yl | bluish-tinged claret |
| 220 | 1-sulfo-4-VS-phen-2-yl | phenyl | 1-oxy-4,6-di-sulfo-phen-2-yl | bluish-tinged claret |
| 221 | 1-sulfo-4-VS-phen-2-yl | phenyl | 1-oxy-4-sulfo-6-chloro-phen-2-yl | bluish-tinged claret (537) |
| 222 | 1-sulfo-5-VS-phen-2-yl | phenyl | 1-oxy-4-sulfo-6-chloro-phen-2-yl | bluish-tinged claret |
| 223 | 1-sulfo-5-VS-phen-2-yl | phenyl | (I) | bluish-tinged claret |
| 224 | 1-sulfo-5-VS- | phenyl | 1-oxy-6-acet- | bluish-tinged |

-continued

| Ex. | Radical —A¹—X— | Radical R | Radical -O-B¹- | Color shade |
|---|---|---|---|---|
| | phen-2-yl | | ylamino-phen-2-yl | claret |
| 225 | 1-sulfo-5-VS-phen-2-yl | phenyl | 1-oxy-4,6-di-sulfo-phen-2-yl | bluish-tinged claret |
| 226 | 1-sulfo-5-VS-phen-2-yl | phenyl | 1-oxy-4-sulfo-phen-2-yl | bluish-tinged claret |
| 227 | 1-sulfo-4-VS-phen-2-yl | methyl | (I) | bluish-tinged claret |
| 228 | 1-sulfo-4-VS-phen-2-yl | methyl | (II) | bluish-tinged claret |
| 229 | 1-sulfo-4-VS-phen-2-yl | methyl | (III) | bluish-tinged claret |
| 230 | 1-sulfo-4-VS-phen-2-yl | methyl | 1-oxy-4-sulfo-phen-2-yl | bluish-tinged claret (536) |
| 231 | 1-sulfo-4-VS-phen-2-yl | methyl | 1-oxy-4,6-di-sulfo-phen-2-yl | bluish-tinged claret |
| 232 | 1-sulfo-4-VS-phen-2-yl | methyl | 1-oxy-4-sulfo-6-chloro-phen-2-yl | bluish-tinged claret |
| 233 | 1-sulfo-5-VS-phen-2-yl | methyl | 1-oxy-4-sulfo-6-chloro-phen-2-yl | bluish-tinged claret |
| 234 | 1-sulfo-5-VS-phen-2-yl | methyl | (I) | bluish-tinged claret |
| 235 | 1-sulfo-5-VS-phen-2-yl | methyl | 1-oxy-6-acet-ylamino-phen-2-yl | bluish-tinged claret |
| 236 | 1-sulfo-5-VS-phen-2-yl | methyl | 1-oxy-4,6-di-sulfo-phen-2-yl | bluish-tinged claret |

USE EXAMPLE 1

An aqueous bath which consists of 0.25 part by volume of a 60% strength aqueous acetic acid, 0.15 part of a commercially available leveling auxiliary for wool and 0.3 part of ammonium sulfate in 400 parts of water is prepared for the purpose of dyeing 10 parts of a yarn of wool. This wool is wetted thoroughly in the bath at a temperature of 30° to 40° C. and a pH of the bath of 5 to 5.2. A solution of 0.2 part of the vinylsulfonyl-copper complex formazan dyestuff of Example 2 in 20 parts of water is then introduced into the bath, while stirring. The wool is still agitated in the bath, the temperature is left at 30° to 40° C. for 5 minutes, the dyebath is then heated to 85° C. in the course of 40 minutes, dyeing is continued at this temperature for 10 minutes and the dyebath is then heated to the boiling point in the course of 10 minutes. Dyeing is continued at the boil for 1 hour. The bath is then cooled to 80° C. The dyestuff used has been absorbed very well onto the wool. After-treatment of the dyed woollen yarn can therefore take place in the same bath. Ammonia is added to a pH of 8 to 8.5, and the material is treated at this pH and at a temperature of 80° C. for 15 minutes. It is removed, rinsed with hot and cold water and dried. A deep claret dyeing with the good use and fabrication properties mentioned in Example 2 is obtained.

USE EXAMPLE 2

An aqueous padding liquor which contains, per liter, 40 g of the copper formazan dyestuff according to the invention of Example 9, 100 g of urea, 30 g of anhydrous sodium sulfate and 16 ml of an aqueous 32.5 % strength sodium hydroxide solution is prepared for dyeing a cotton fabric. The cotton fabric is padded at room temperature with a liquor pick-up of 80% of the weight of the cotton fabric, wound onto a beam, wrapped in a plastic film and left to lie at room temperature for 24 hours. During this time, the dyestuff is fixed. After soaping and rinsing in the customary manner, a deep brilliant claret dyeing which has the good use and fabrication properties mentioned in Example 9 is obtained.

USE EXAMPLE 3

An aqueous dyebath which contains, in 2000 parts by volume, 5 parts of the copper formazan dyestuff according to the invention of Example 4, 100 parts of sodium chloride, 10 parts of anhydrous sodium carbonate and 4 parts by volume of a 32.5% strength aqueous sodium hydroxide solution as a solution is prepared for dyeing a cotton fabric. 100 parts of a cotton fabric are introduced into this dyebath and dyed at a temperature of 40° C. for between 60 and 90 minutes. After soaping and rinsing in the customary manner, a deep brilliant violet dyeing with the good use and fabrication properties mentioned in Example 4 is obtained.

USE EXAPLE 4

A printing paste which contains, per 1000 parts, 30 parts of the copper formazan dyestuff according to the invention of Example 9, 50 parts of urea, 375 parts of water, 500 parts of a neutral 4% strength aqueous alginate thickener, 15 parts of sodium bicarbonate and 10 parts of the sodium salt of m-nitrobenzoic acid is used for printing a mercerized cotton fabric. The cotton fabric is printed with this printing paste in the customary manner and, after drying, is steamed with steam of 101° to 103° C. for 10 to 15 minutes. After this fixing operation, the fabric is finished in the customary manner by rinsing with cold and hot water, by soaping at the boiling point and renewed rinsing with water and by subsequent drying. A deep brilliant claret-colored print of good light- and wet-fastnesses is obtained.

USE EXAMPLE 5

A solution of 30 parts of the copper formazan dyestuff according to the invention of Example 9 in 200 parts of water at 70° C. is stirred into 500 parts of a neutral or weakly acid 4% strength alginate thickener. The thickened dyestuff solution is made up to 1000 parts with water. A fabric of mercerized cotton is printed in the customary manner with the printing paste thus prepared, and is then dried and passed through a hot aqueous fixing bath, which contains, in 1000 parts of water, 100 parts of sodium chloride, 150 parts of anhydrous sodium carbonate, 50 parts of anhydrous potassium carbonate and 70 parts by volume of a 33% strength aqueous sodium hydroxide solution, at 90° to 105° C. in order to fix the dyestuff. Fixing is already effected here within a few seconds, so that the printed fabric can be passed through very rapidly. After this fixing treatment, the fabric is finished in the customary manner by rinsing with cold water and by hot washing, renewed rinsing with water and drying. A level, claret-colored print sample of good light- and wet-fastnesses is obtained.

USE EXAMPLE 6

An aqueous padding liquor which contains, per 1000 parts by volume, 40 parts of the copper formazan dyestuff according to the invention of Example 9, 95 parts by volume of waterglass, 5 parts of a commercially available leveling auxiliary and 28.5 parts by volume of an aqueous 32.5% strength sodium hydroxide solution is prepared for dyeing a cotton fabric. The cotton fabric is padded at room temperature at a liquor pick-up of 80% of the weight of the cotton fabric, wound onto a beam, wrapped in plastic film and left to stand at room temperature for 24 hours. During this time, the dyestuff is fixed. After soaping and rinsing in the customary manner, a deep brilliant claret-colored dyeing of good light- and wet-fastnesses is obtained.

USE EXAMPLE 7

An aqueous dyebath which contains, in 2000 parts by volume, 6 parts of the copper formazan dyestuff according to the invention of Example 1, 10 parts of anhydrous sodium sulfate, 10 parts of anhydrous sodium carbonate and 4 parts by volume of a 32.5% strength aqueous sodium hydroxide solution, is prepared for dyeing a cotton fabric. 100 parts of a cotton fabric are introduced into this dyebath and dyed at a temperature of 60° C. for between 60 and 90 minutes. After soaping and rinsing in the customary manner, a deep bluish-tinged claret dyeing with the good fastness properties mentioned in Example 1 is obtained.

USE EXAMPLE 8

If the procedure followed is one of the procedures according to the present invention for dyeing and printing wool or synthetic polyamide materials or cellulose fiber materials, for example analogously to Use Examples 1 to 7, and other copper complex formazan dyestuffs according to the invention described in the embodiment and Tabular Examples 1 to 236 are used for this, according to the invention, as the dyestuff, strong dyeings and prints with good fastnesses and the color shades mentioned for these dyestuffs are likewise obtained.

I claim:

1. A copper complex formazan compound of the formula

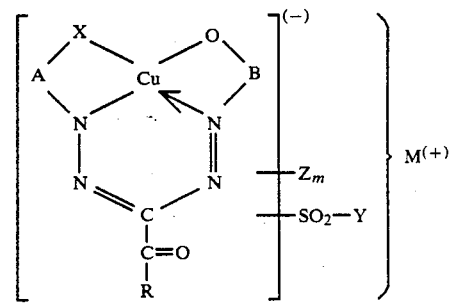

in which:

A is phenylene unsubstituted or substituted by the group Z defined below;

B is phenylene unsubstituted or substituted by the group Z defined below;

Z is sulfo;

m is the number 1 or 2;

Y is $\beta$-sulfatoethyl, and that group $-SO_2-Y$ is bonded to A or to B;

X is oxygen or carbonyloxy of the formula $-CO-O$, or is a group of the formula $-SO_3^{(-)}$ bonded only with A;

the group X and the N atom are bonded to A in the ortho-position relative to one another;

the O atom and N atom are bonded to B in the ortho-position relative to one another;

R is phenyl or methyl; and

M is hydrogen or an alkali metal.

2. A compound as claimed in claim 1, in which the group $-SO_2-Y$ is bonded to B.

3. A compound as claimed in claim 1, corresponding to the formula (1a)

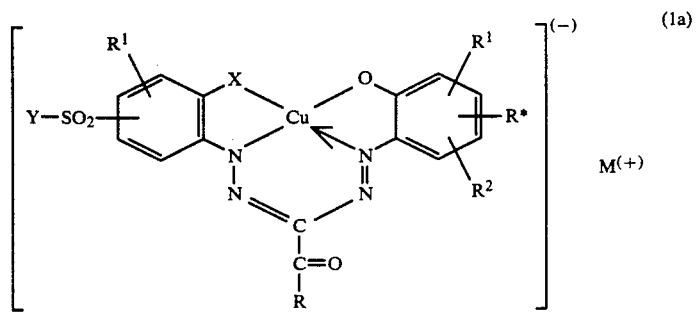

in which $R^1$ is a hydrogen atom or a sulfo group, at least one $R^1$ being a sulfo group,
$R^2$ is hydrogen,
$R^*$ is hydrogen,
R is methyl or phenyl,
X is carbonyloxy or oxy.

4. A compound as claimed in claim 1, corresponding to the formula (1b)

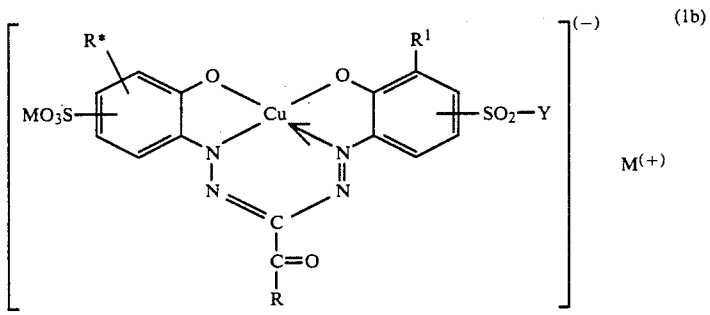

in which
$R^1$ is a hydrogen atom or a sulfo group,
$R^*$ is hydrogen,
R is methyl or phenyl.

5. A compound as claimed in claim 1, corresponding to the formula (1c)

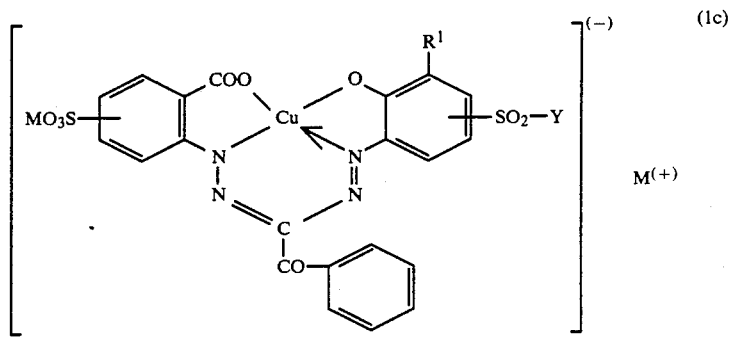

in which
$R^1$ is a hydrogen atom or a sulfo group.

* * * * *